US007118140B2

(12) United States Patent
Kilgore

(10) Patent No.: US 7,118,140 B2
(45) Date of Patent: Oct. 10, 2006

(54) COMPLIANT SEALING CONNECTION FOR FUEL COMPONENTS

(75) Inventor: Jason T. Kilgore, Newport News, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/985,071

(22) Filed: Nov. 1, 2001

(65) Prior Publication Data

US 2003/0080556 A1 May 1, 2003

(51) Int. Cl.
*F16L 17/00* (2006.01)

(52) U.S. Cl. ...................... 285/374; 285/917; 277/613; 277/607; 123/456; 123/470

(58) Field of Classification Search .................. 29/523, 29/507, 508; 123/456, 470; 285/9.7, 189, 285/382, 374, 9.2, 125.1, 357, 329; 277/607, 277/613, 608; 403/109.1, 377, 365–368; 138/92, 89, 96 R See application file for complete search history.

(56) References Cited

U.S. PATENT DOCUMENTS

| | | | | |
|---|---|---|---|---|
| 1,839,340 A | | 1/1932 | Pittlick | |
| 2,330,841 A | | 10/1943 | Parker | |
| 2,847,757 A | * | 8/1958 | Mock et al. | 138/92 |
| 3,036,674 A | * | 5/1962 | Branin | 403/270 |
| 3,042,428 A | * | 7/1962 | Gardiner | 285/148.12 |
| 3,125,078 A | | 3/1964 | Reiners | |
| 3,275,348 A | | 9/1966 | Scott | |
| 3,871,800 A | * | 3/1975 | Slayton | 418/248 |
| 3,972,548 A | * | 8/1976 | Roseen | 285/381.4 |
| 4,036,514 A | * | 7/1977 | Hannover | 285/222 |
| 4,240,774 A | * | 12/1980 | Ladusaw | 418/248 |
| 4,457,280 A | * | 7/1984 | Hudson, Jr. | 123/470 |
| 4,502,511 A | * | 3/1985 | Zafred | 138/89 |
| 4,507,008 A | | 3/1985 | Adl et al. | |
| 4,513,786 A | * | 4/1985 | Sodergren et al. | 138/89 |
| 4,637,436 A | * | 1/1987 | Stewart et al. | 138/89 |
| 4,648,632 A | | 3/1987 | Hagner | |
| 4,750,457 A | * | 6/1988 | Bonutti | 123/198 D |
| 5,022,437 A | * | 6/1991 | Potz et al. | 138/89 |
| 5,076,313 A | | 12/1991 | Bottum, Jr. et al. | |
| 5,169,182 A | | 12/1992 | Hashimoto | |
| 5,183,400 A | * | 2/1993 | Tada et al. | 417/572 |
| 5,393,108 A | | 2/1995 | Kerr | |
| 5,507,530 A | * | 4/1996 | Mahaney | 285/124.1 |
| 5,507,531 A | | 4/1996 | Aldridge | |
| 5,609,138 A | | 3/1997 | Mutschler | |
| 5,752,487 A | | 5/1998 | Harrell et al. | |
| 6,112,722 A | * | 9/2000 | Barnhart et al. | 123/470 |
| 6,257,846 B1 | * | 7/2001 | Muramatsu et al. | 417/410.3 |

* cited by examiner

*Primary Examiner*—Aaron Dunwoody

(57) ABSTRACT

A fuel communicating assembly including a base having a wall disposed about a longitudinal axis. The wall having a surface exposed to the longitudinal axis. The surface defining a chamber. The wall having an end that defines an aperture to the chamber. The assembly further including a component having a housing. The housing having an exterior surface. A portion of the exterior surface disposed within the chamber. A metallic member having an inner surface and an outer surface contiguous with the exterior surface of the component. The outer surface is contiguous with the surface of the wall so that the portion of the exterior surface of the component is retained within the chamber and the aperture of the chamber is hermetically sealed. A method of retaining a component within a base is also described.

32 Claims, 2 Drawing Sheets

FIG. 2
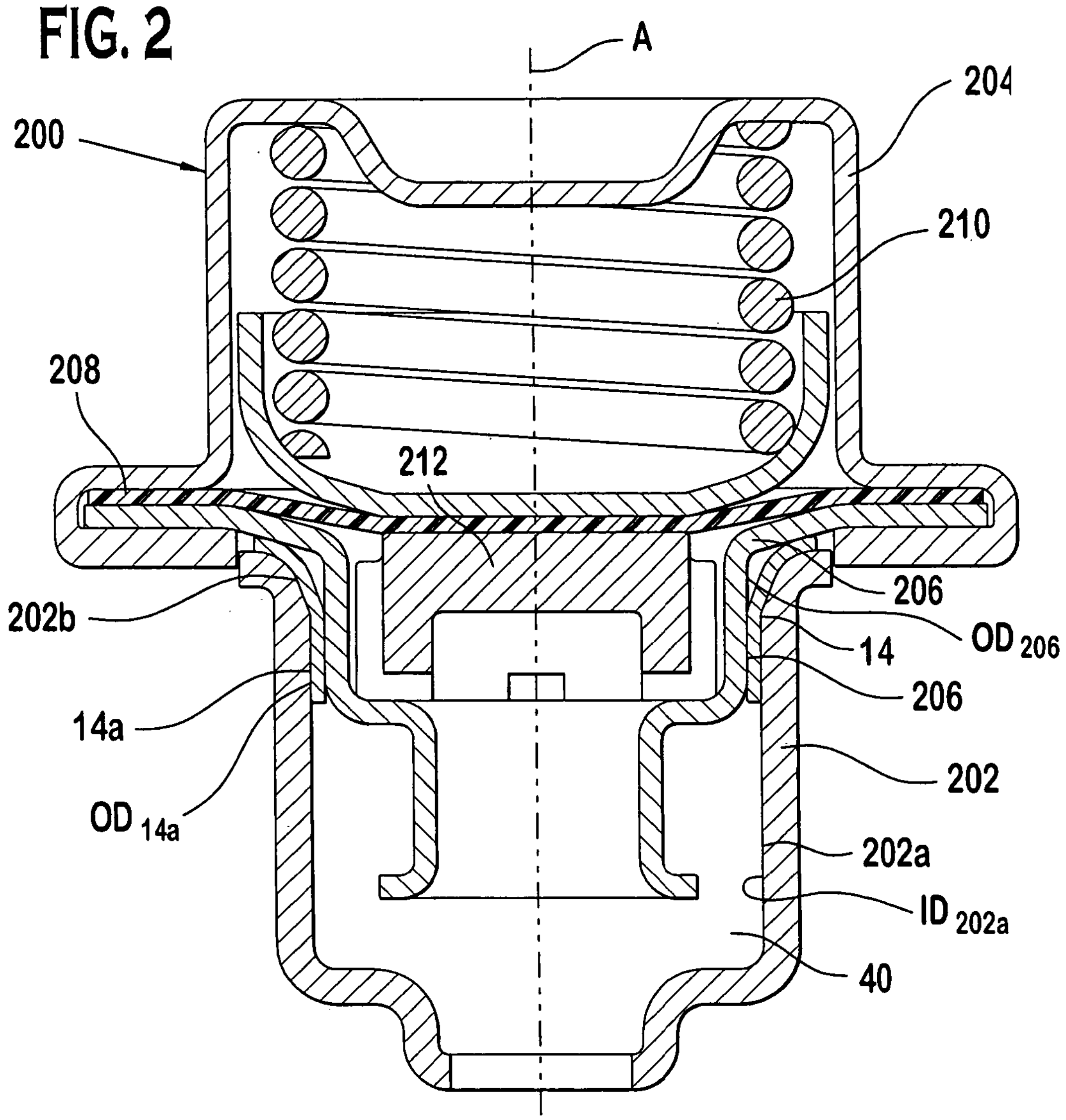
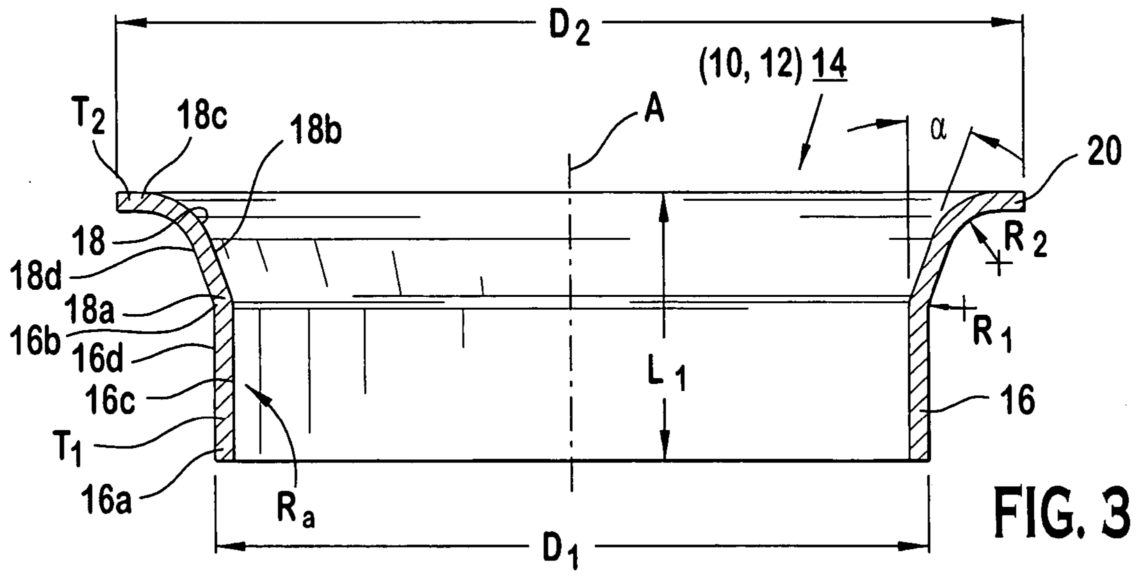
FIG. 3

COMPLIANT SEALING CONNECTION FOR FUEL COMPONENTS

BACKGROUND OF THE INVENTION

It is believed that sealed connections are used in fluid communication assemblies. These sealed connections typically include a threaded inner bore that is formed in a female fitting. The female fitting typically also has a conical seal-seating surface formed at its outer end. The connection also generally provides a male fitting that is threaded in the outer bore. The male fitting typically also has a conical seal-seating surface formed on the outer bore. The seal-seating surface of the male fitting is generally complementary to the conical surface formed at the outer end of the bore of the female fitting. The connection further provides a sealing member formed of a compliant metallic material. The sealing member typically has a generally complementary seal-seating surface that provides a sealed connection. The sealing member is typically compressed between the complementary sealing surfaces. The male fitting is generally tightened to a predetermined torque and the sealing member fluidly seals the female and male fitting members.

It would be beneficial to provide a sealed connection without having to provide male and female fittings that are threaded. In addition, it would be beneficial to eliminate the step of tightening the threaded fittings to a predetermined torque in order to seal the connection.

SUMMARY OF THE INVENTION

The present invention provides a fuel handling assembly for retaining a component within a base. The fuel handling assembly includes the base having a wall disposed about a longitudinal axis. The wall has a surface exposed to the longitudinal axis. The surface defines a chamber. The wall has an end that defines an aperture to the chamber. The assembly further includes a component having a housing. The housing has an exterior surface. A portion of the exterior surface is disposed within the chamber. A metallic member having an inner surface and an outer surface is contiguous with the exterior surface of the component. The outer surface is contiguous with the surface of the wall so that the portion of the exterior surface of the component is retained within the chamber and the aperture of the chamber is hermetically sealed.

The present invention further provides a method of retaining a component within a base. The method can be achieved by disposing a metallic member about an end of the component and inserting the end of the component into a base to form a seal between the base and the metallic member and between the metallic member and the component. The component is retained within the fuel passage without engagement between the component and the base.

BRIEF DESCRIPTION OF THE DRAWINGS

The accompanying drawings, which are incorporated herein and constitute part of this specification, illustrate an embodiment of the invention, and, together with the general description given above and the detailed description given below, serve to explain the features of the invention.

FIG. 2 shows a cross-sectional view of another preferred embodiment of a fuel handling assembly.

FIG. 3 shows a cross-sectional view of a preferred embodiment of a sealing and retaining member usable in the fuel handling assemblies of FIGS. 1 and 2.

DETAILED DESCRIPTION OF THE PREFERRED EMBODIMENT

Figure 1:
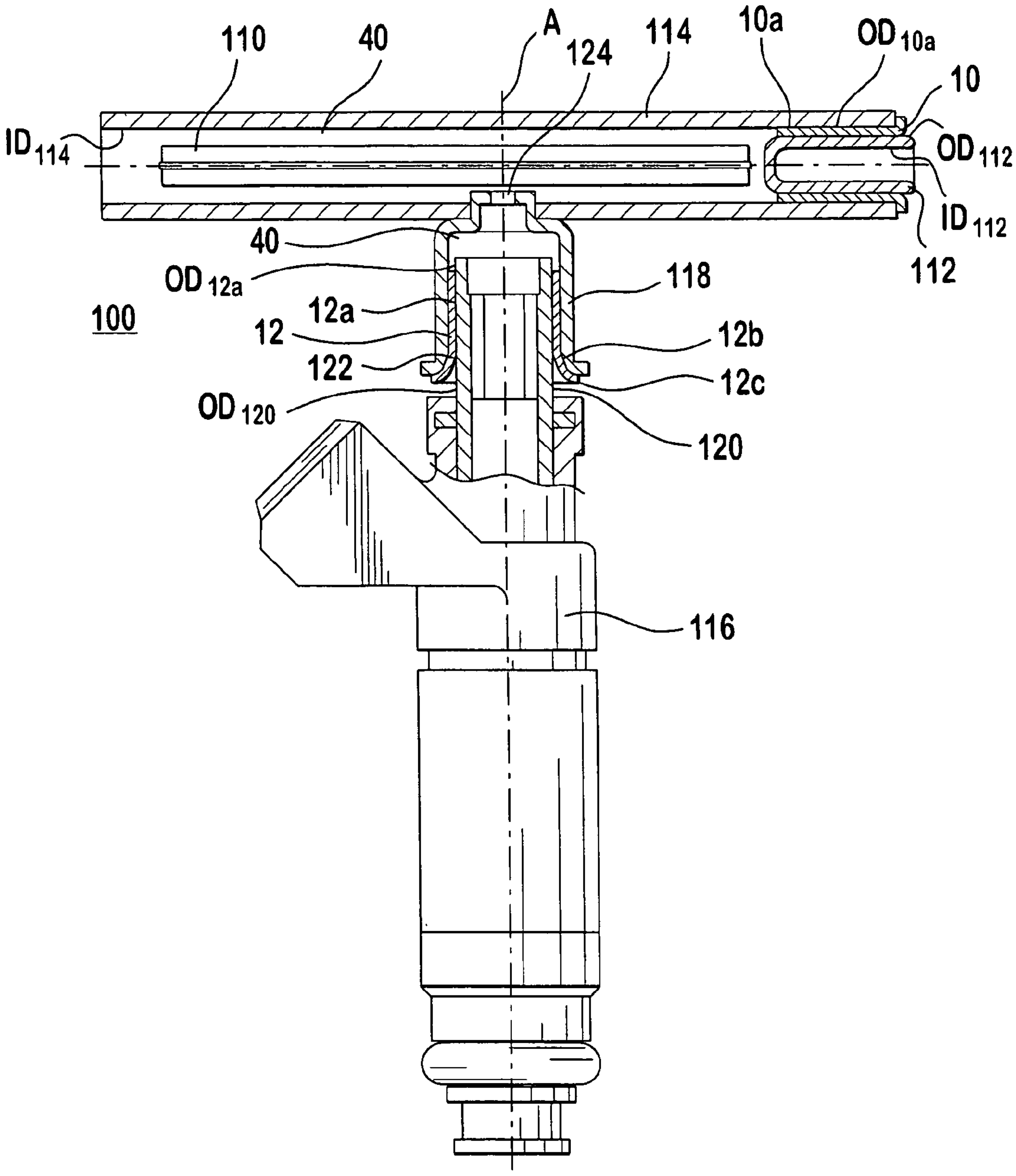
FIG. 1 shows a cross-sectional view of a preferred embodiment of a fuel handling assembly.

With reference to FIG. 1, a preferred embodiment of a fuel handling assembly 100 is shown. The fuel handling assembly 100 includes an internal damper 110 disposed within a fuel rail 114 having an internal volume that receives pressurized fuel 40. A fuel rail end cap 112 is coupled to the fuel rail 114 that has at least one fuel injector 116 coupled to the fuel rail 114. The fuel rail 14 is coupled to a fuel rail end cap 112 by a first connection member 10. It should be noted that other components, such as, for example, a fuel line or a cross-over fuel line between two or more fuel rails can also be coupled to the fuel rail 114 by a similar connection member.

In particular, the fuel rail 114 has an inside diameter ("$ID_{114}$") that is generally the same as the outside diameter ("$OD_{10a}$") of a first portion **10*a* of the first connection member 10. Preferably, the $ID_{114}$ of the fuel rail 114 and the $OD_{10a}$ of the first portion 10*a* should be configured so as to permit a "slip-fit" between the connection member 10 and the fuel rail 114. It should be understood that a slip-fit, in most practical applications, denotes a semi-permanent attachment of the connection member to a component that also allows repositioning of the connection member, such as, for example, during initial installation or adjustment thereafter. That is, as used throughout this disclosure, the term "slip-fit" denotes a fit where accuracy of location is important, but a small amount of either clearance or interference is permissible. Adhesives can also be used in conjunction with the connection member to assist the slip-fit in the retaining and sealing function of the connection member 10** to the components of the fuel system.

The first portion **10*a* has an inside diameter ("$ID_{10a}$") that is approximately the same as the outside diameter ("$OD_{112}$") of the fuel rail end cap 112. Preferably, the $ID_{10a}$ of the first portion 10*a* and the $OD_{112}$ of the fuel rail end cap 112 should be configured so as to permit a "press-fit." It should be understood that a press-fit, in practical applications, denotes a permanent attachment of the connection member to a component that may cause substantial damage on the connection member so as to render it unusable upon removal. That is, as used herein, the term "press-fit" denotes a fit characterized by an approximately constant bore pressure between the connection member and the respective components, and which pressure is below a yield point for plastic deformations. Adhesives can also be used in conjunction with the connection member 10 to assist the press-fit in retaining and sealing the connection member 10 to the rail end cap 112**.

In order to couple the fuel rail end cap 112 to the fuel rail 114, the internal damper 110 is inserted into the fuel rail, and the first connection member 10 is inserted into an opening in the fuel rail 114. The fuel rail end cap 112 is then inserted, instead of being torqued, threaded or twisted, into an opening of the first connection member 10. Here, the first connection member 10 should be a material of greater compliance (i.e. having a linear elastic behavior) than the parts that are to be attached together. Thus, due to the compliant nature of the first connection member 10 and its physical geometries, the first connection member 10 retains the fuel rail end cap 112 and allows a high pressure hermetic seal to be formed between fuel rail 114 and the fuel rail end cap 112 by only inserting the fuel rail end cap 112 into the first connection member 10 that has been mounted beforehand in the fuel rail 114. Alternatively, the first connection member 10 could also be pre-mounted on the fuel rail end cap 112 before the fuel rail end cap 112 is inserted into the fuel rail 114. Preferably, the fuel rail end cap 112 and the fuel rail 114 are made of steel, and the first connection member 10 is made of brass or alloys of copper. It should be noted, however, that the fuel rail end cap 112 can be made of the same or a different material from the fuel rail 114 as long as the first connection member 10 has a greater linear elastic behavior than the material(s) for the fuel rail end cap 112 and the fuel rail 114. That is, the connection member 10 should not undergo plastic, or permanent deformations upon insertion of the fuel rail end cap 112 to the fuel rail 114 or vice versa.

The fuel injector 116 is mounted in an intake plenum or manifold (not shown) of an internal combustion engine (also not shown). The fuel injector 116 is coupled to the fuel rail 114 by a fuel injector cup 118 having a first opening 122 and a second opening 124 which is affixed to the fuel rail 114. Specifically, an inlet end 120 of the fuel injector 116 is coupled to the first opening 122 of the fuel injector cup 118 via a second connection member 12 to receive pressurized fuel 40. In particular, the first opening 122 has an inside diameter ("$ID_{122}$") that is generally the same as the outside diameter ("$OD_{12a}$") of a first portion **12*a* of the second connection member 12. The first portion 12*a* of the second connection member 12 has an inside diameter ("$ID_{12a}$") that is approximately the same as the outside diameter ("$OD_{120}$") of the fuel injector inlet 120. In particular, the fuel rail 114 has an inside diameter ("$ID_{114}$") that is generally the same as the outside diameter ("$OD_{10a}$") of a first portion 12*a* of the connection member 12. Preferably, the $ID_{122}$ of the opening 122 and the $OD_{12a}$ of the first portion 12*a* should be configured so as to permit a "slip-fit" between the connection member 12 and the opening 122. It should be understood that a slip-fit, in most practical applications, denotes a semi-permanent attachment of the connection member to a component that also allows repositioning of the connection member, such as, for example, during initial installation or adjustment thereafter. That is, as used throughout this disclosure, the term "slip-fit" denotes a fit where accuracy of location is important, but a small amount of either clearance or interference is permissible. Adhesives can also be used in conjunction with the connection member to assist the slip-fit in the retaining and sealing functions of the connection member 12 to the opening 122**.

The first portion **12*a* has an inside diameter ("$ID_{12a}$") that is approximately the same as the outside diameter ("$OD_{122}$") of the opening 122. Preferably, the $ID_{12a}$ of the first portion 12*a* and the $OD_{122}$ of the opening 122 should be configured so as to permit a "press-fit." It should be understood that a press-fit, in practical applications, denotes a permanent attachment of the connection member to a component that may cause substantial damage on the connection member so as to render it unusable upon removal. That is, as used herein, the term "press-fit" denotes a fit characterized by an approximately constant bore pressure between the connection member and the respective components, and which pressure is below a yield point for plastic deformations. Adhesives can also be used in conjunction with the connection member to assist the press-fit in retaining and sealing the connection member 12 to the opening 122**.

The second connection member 12 also includes a second portion **12*b* that extends along at least one, preferably, two radii of curvatures so as to terminate in a flared end portion 12*c*. In order to couple the fuel injector inlet 28 to the first opening 122 of the injector cup 118, the second connection member 12 can inserted into the first opening 122 of the cup 118 or the second connection member 12 can be mounted on the inlet 120 of the fuel injector. The fuel injector 116 is mounted into an intake plenum or an intake manifold. The fuel rail 114, with the injector cup 118 aligned with the inlet 120 of the fuel injector 116 is then displaced along a longitudinal axis A—A of the fuel injector 116 so as to form a hermetic seal between the cup 118 and the inlet 120 of the fuel injector. Here, the second connection member 12 should be a material of greater compliance (i.e. having a linear elastic deformation behavior) than the parts that are to be attached together. Thus, due to the compliant nature of the second connection member 12 and its physical geometries, the second connection member 12 allows a high pressure hermetic seal to be formed between the injector cup 118 and the fuel injector 116 by simply coupling the two parts together with the second connection member 12 being either pre-mounted to either the injector cup 118 or, preferably, to the inlet 120 of the fuel injector 116. Preferably, the injector cup 118 and the inlet 120 are made of steel, and the second connection member 12 is made of brass or alloys of copper. It should be noted, however, that the inlet 120 can be made of the same material or a different material from the injector cup 118 as long as the second connection member 12 has a greater linear elastic behavior than the material(s) for these components. That is, the connection member 12 should not undergo plastic, or permanent deformation upon insertion of the inlet 120 in the injector cup 118** or vice versa.

FIG. 2 illustrates another embodiment of a hermetic seal that can be formed between a fuel pressure damper 200 and a mounting cup 202. The fuel pressure damper 200 includes a first housing portion 204 coupled to a second housing portion 206. The first housing portion 204 can be coupled to the second housing portion 206 by a suitable technique, such as, for example, welding, brazing, bonding, riveting, laser welding or preferably crimping. A flexible diaphragm 208 is located between a spring member 210 and a reciprocable piston 212. A third connection member 14 forms a high pressure seal between the second housing portion 204 and an inside surface of the mounting cup 202. The mounting cup 202 receives pressurized fuel 40 within the cup that may be undergoing rapid pressure fluctuations. The mounting cup 202 has a first opening **202*a* with an inside diameter ("$ID_{202a}$") that is generally the same as the outside diameter ("$OD_{14a}$") of a first portion 14*a* of the connection member 14. The first portion 14*a* of the connection member 14 has an inside diameter ("$ID_{14a}$") that is approximately the same as the outside diameter ("$0D_{206}$") of the second housing portion 206 of the fuel pressure damper 200. It should be noted that at least one complementary surface, such as, for example 202*b*, can be formed on the second housing portion 206 that mates with a surface of the connection member 14. Preferably, the $I.D_{202a}$ of the opening 202*a* and the $OD_{14a}$ of the connection member 14 and the $I.D_{202a}$ of the opening 202*a* should be configured so as to permit a "slip-fit" between the $OD_{14a}$ of the connection member 14 and the $I.D_{202a}$ of the opening 202*a*. Alternatively, adhesives can also be used in conjunction with the slip-fit of the connection member 14 to the opening 202*a***.

The first portion **14*a* has an inside diameter ("$ID_{14a}$") that is approximately the same as the inside diameter ("$OD_{202a}$ ") of the opening 202*a*. Preferably, the $ID_{14a}$ of the first portion 14*a* and the $OD_{202a}$ of the opening 202*a* should be configured so as to permit a "press-fit."Alternatively, adhesives can also be used in conjunction with the press-fit of the connection member 14 to the opening 202***a* of the mounting cup 202.

It should be noted that the third connection member 14 operates similarly to the first and second connection members 10 and 12 except for minor differences in materials or dimensional parameters. In particular, the connection member 14 is mounted to the mounting cup 202 by a slip-fit. The fuel damper 200 with its second housing portion 206 is then press-fitted into the connection member 14. Here, as with the connection members 10 and 12, the connection member 14 allows the components to be installed in a single motion, thereby eliminating threaded, barbed or specialized fittings. The connection member 14, due to its elastic deformation and physical geometries when the components are installed, also allows a hermetic seal to be formed and the components to be retained to each other under both operative and burst pressures.

Details of the connection member 14 can be seen in FIG. 3. Specifically, the connection member 14 is preferably made of brass or alloys of copper. The connection member 14 extends along the longitudinal axis A for a length of L1 between three portions: (1) a generally cylindrical sleeve portion 16, (2) a curved portion 18, and (3) a flat portion or stop segment 20, in which all three portions have a generally constant thickness with different tolerances depending on the portions. The generally cylindrical sleeve portion 16 approximates a thin-wall cylinder of a first thickness T1 and an outside diameter D1 . The portion 16 is disposed about a longitudinal axis A between a first end 16*a* and a second end 16*b*. An inside surface 16*c* of the cylindrical portion should preferably have a smoother finish or lower roughness ($R_a$ or arithmetic mean-value as given by ASME B46.1-1985) measurement than the roughness of an outside surface 16*d*. The generally cylindrical sleeve portion 16 also extends at one end 16*b* along the longitudinal axis towards the curved portion 18. The curved portion 18 is also disposed about the longitudinal axis A and extends between a first curved end or first inflection 18*a* and a second curved end or second inflection 18*c* with transition portion 18*b* connecting the inflection ends 18*a* and 18*b*. The first inflection end 18*a* is located at a first distance from the longitudinal axis that is less than the distance at which the second inflection end 18*c* is located from the longitudinal axis. The first curved portion 18*a* is formed by a chamfer having a first radius of curvature R1 for a predetermined distance so as to form a first lead-in before joining with the transition portion 18*b*. The first lead-in aids in aligning and inserting of the connection member 14 into an opening of a fuel supply components, such as, for example, a fuel injector cup, a fuel rail or a fuel damper cup. The intermediate portion 18*b* diverges generally obliquely at approximately angle $\alpha$ with respect to the longitudinal axis A for another predetermined distance before joining with the second curved portion 18*c*. The second curved portion 18*c* approximates a second radius of curvature R2 so as to form a second lead-in. The second lead-in is operative to generate a constant biasing force (or clamping force) generally oblique to the surfaces 16*c* such that the biasing force clamps two couplable components together. Additionally, the biasing force causes the surface 16*c*, 16*d*, 18*b* and 18*d* to increase the static friction coefficient between surface(s) of the couplable components and the connection member 14. Both of the clamping force and the friction operate to form a seal and to retain the two couplable components together.

The intermediate portion 18*b* and the second curved portion 18*c* have generally the same thickness T2. The flat portion or stop portion 20 extends generally transverse to the longitudinal axis and terminates at a second outside diameter D2.

In one preferred embodiment, the first diameter D1 is approximately 13.38 millimeter, the second diameter is approximately 17 millimeter, the first radius of curvature R1 is approximately 0.35 millimeter, the second radius of curvature R2 is approximately 1 millimeter, the roughness $R_a$ of the inner surface 16*c* is preferably between approximately 0.32 micron to approximately 1.6 micron, the roughness $R_a$ outer surface 16*d* is approximately 0.8 micron to approximately 2.0 micron, the angle $\alpha$ is approximately 20 degrees or less but not greater than 37 degrees, the thickness T1 is approximately 0.35 millimeter with a tolerance of ±0.02 millimeter and the thickness T2 is approximately 0.35 millimeter with a tolerance of +0.06 millimeter and (−)0.02 millimeter. Testing procedures have demonstrated that the preferred connection member (having the preferred parameters) will form a hermetic seal upon installation between different components of a fuel delivery system such that the connection member remains a hermetic seal at operating fuel pressure of approximately 2–60 pounds per square-inch (“psi”) and beyond a rated burst pressure of approximately 600 to 1000 psi, in a environment between approximately −20 degrees Celsius to over 150 degrees Celsius. It has also been demonstrated through testing procedures that approximately 445 Newton of force is required for insertion of one component to another component with the connection member pre-mounted on one of the components.

It should be noted that although the connection members 10, 12 and 14 have been shown for specific fuel supply components, the connection member can be used in devices that require a retainer to provide a hermetic seal but which do not need or require threaded, barbed or specialized fittings. It should also be understood that the connection member can be used for a variety of pressurized environments and is not limited to the tested environment. The devices can be, for example, air pump components, air intake plenum or manifolds, valve cover components, positive and negative pressure pumps. Thus, the connection member would connect and hermetically seal two operative components within any one of these devices.

It is contemplated that other type of devices that require a retainer and a hermetic seal (for pressurized or unpressurized environment) without barbed, threaded, or special fittings will be known to those skilled in the art, and such devices are within the scope of the preferred embodiments.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

I claim:

1. An assembly comprising:

a base having a wall disposed about a longitudinal axis, the wall having a surface exposed to the longitudinal axis, the surface defining a chamber, the wall having an end that defines an aperture to the chamber;

a component having a housing, the housing having an exterior surface spaced from the surface of the base, a portion of the exterior surface being disposed within the chamber, the component comprising at least one of a fuel rail end cap and a fuel pressure damper; and a metallic member having an inner surface and an outer surface, the inner surface having a lower surface roughness than the surface roughness of the outer surface, the inner surface being contiguous with the exterior surface of the component and the outer surface being contiguous with the surface of the wall so that the portion of the exterior surface of the component is retained within the chamber and the aperture of the chamber is hermetically sealed, the metallic member having a tubular wall having a cross-sectional area approximately equal to a cross sectional area of the component, the tubular wall including:

an inner surface and an outer surface;

a sleeve portion proximate the base, the inner surface and outer surface of the sleeve portion being substantially parallel to the longitudinal axis; and a lead-in portion extending away from the sleeve portion and being contiguous therewith, the inner and outer surfaces of the lead-in portion curling away from the longitudinal axis as they extend away from the sleeve portion.

2. The assembly of claim 1, wherein the metallic member comprises an annulus, the inner surface of the metallic member comprises a first surface of the annulus normal to a central axis of the annulus and the outer surface of the metallic member comprises a second surface of the annulus, the second surface being concentric to the first surface.

3. The assembly of claim 2 wherein the surface of the base has a first diameter.

4. The assembly of claim 3 wherein the exterior surface of the housing comprises a second diameter.

5. The assembly of claim 4 wherein the inner surface of the annulus is substantially equal to the second diameter and the outer surface of the annulus is substantially equal to the first diameter.

6. The assembly of claim 5, wherein the surface of the base comprises an inner surface contiguous with the wall, the inner surface defining a cross-sectional area about the longitudinal axis of the base, the annulus and exterior surface being disposed within the base, the outer surface of the annulus defining a cross-sectional area about the longitudinal axis being approximately equal to the cross-sectional area of the base.

7. The assembly of claim 1, wherein the metallic member forms a hermetic seal that remains a seal at operational fuel pressurized at approximately 2 psi to 60 psi and at a burst fuel pressure of greater than 600 psi.

8. The assembly of claim 1, wherein the lead-in portion comprises a first inflection point proximate the sleeve portion, an outer end opposite the sleeve portion, and a second inflection point disposed between the first inflection point and the outer end, the first inflection point being at a distance from the longitudinal axis substantially equal to that of the first portion, the second inflection point being disposed at a greater distance from the longitudinal axis than the first inflection point, and the outer end being disposed at a greater distance from the longitudinal axis than the second inflection point.

9. The assembly of claim 8, wherein the lead-in portion of the tubular wall further comprises a transition segment disposed between the first inflection point and the second inflection point, and a stop segment disposed between the second inflection point and the outer end, the transition segment being disposed at a transition angle acute to the longitudinal axis, the stop segment being disposed at a lead-in angle acute to the transition segment.

10. The assembly of claim 9, wherein the transition acute angle is approximately 20 to 37 degrees.

11. The assembly of claim 1, wherein the component comprises an end cap.

12. The assembly of claim 1, wherein the metallic member comprises a compliant material.

13. The assembly of claim 1, wherein the metallic member comprises a copper alloy.

14. The assembly of claim 1, wherein the metallic member comprises an annulus, the inner surface of the metallic member comprises a first surface of the annulus generally normal to a central axis of the annulus and the outer surface of the metallic member comprises a second surface of the annulus, the second surface being concentric to the first surface.

15. The assembly of claim 14, wherein the surface of the base has a first diameter about the central axis, and wherein the surface of the base comprises an inner surface contiguous with the wall, the inner surface defining a cross-sectional area about the longitudinal axis of the base, the annulus and exterior surface being disposed within the base, the outer surface of the annulus defining a cross-sectional area about the longitudinal axis being approximately equal to the cross-sectional area of the base.

16. The assembly of claim 15, wherein the exterior surface of the housing comprises a second diameter about the central axis, and wherein the inner surface of the annulus is substantially equal to the second diameter and the outer surface of the annulus is substantially equal to the first diameter.

17. The assembly of claim 1, wherein the metallic member forms a hermetic seal that remains a seal against fuel pressurized in one of the base or component at approximately 2 psi to 60 psi and at a burst fuel pressure of greater than 600 psi.

18. The assembly of claim 1, wherein the metallic member comprises at least one of a compliant material or a copper alloy and combinations thereof.

19. The assembly of claim 1, wherein the lead-in portion comprises a first inflection point proximate the sleeve portion, an outer end opposite the sleeve portion, and a second inflection point disposed between the first inflection point and the outer end, the first inflection point being at a distance from the longitudinal axis substantially equal to that of the first portion, the second inflection point being disposed at a greater distance from the longitudinal axis than the first inflection point, and the outer end being disposed at a greater distance from the longitudinal axis than the second inflection point.

20. The assembly of claim 19, wherein the lead-in portion of the tubular wall further comprises a transition segment disposed between the first inflection point and the second inflection point, and a stop segment disposed between the second inflection point and the outer end, the transition segment being disposed at a transition angle acute to the longitudinal axis, the stop segment being disposed at a lead-in angle acute to the transition segment.

21. The assembly of claim 20, wherein the transition acute angle is approximately 20 to 37 degrees.

22. The assembly of claim 1 wherein the metallic member comprises a compliant material.

23. The assembly of claim 1, wherein the metallic member comprises a copper alloy.

24. An assembly, comprising:

a base having a wall disposed about a longitudinal axis, the wall having a surface exposed to the longitudinal axis, the surface defining a chamber, the wall having an end that defines an aperture to the chamber;

a component having a housing, the housing having an exterior surface, a portion of the exterior surface being disposed within the chamber; and a metallic member having an inner surface and an outer surface, the inner surface being contiguous with the exterior surface of the component and the outer surface being contiguous with the surface of the wall so that the portion of the exterior surface of the component is retained within the chamber and the aperture of the chamber is hermetically sealed, wherein the base comprises an injector cup.

25. The assembly of claim 24, wherein the metallic member comprises an annulus, the inner surface of the metallic member comprises a first surface of the annulus generally normal to a central axis of the annulus and the outer surface of the metallic member comprises a second surface of the annulus, the second surface being concentric to the first surface.

26. The assembly of claim 25, wherein the surface of the base has a first diameter about the central axis, and wherein the surface of the base comprises an inner surface contiguous with the wall, the inner surface defining a cross-sectional area about the longitudinal axis of the base, the annulus and exterior surface being disposed within the base, the outer surface of the annulus defining a cross-sectional area about the longitudinal axis being approximately equal to the cross-sectional area of the base.

27. The assembly of claim 26, wherein the exterior surface of the housing comprises a second diameter about the central axis, and wherein the inner surface of the annulus is substantially equal to the second diameter and the outer surface of the annulus is substantially equal to the first diameter.

28. The assembly of claim 24, wherein the metallic member forms a hermetic seal that remains a seal against fuel pressurized in one of the base or component at approximately 2 psi to 60 psi and at a burst fuel pressure of greater than 600 psi.

29. An assembly comprising:

a base having a wall disposed about a longitudinal axis, the wall having a surface exposed to the longitudinal axis, the surface defining a chamber, the wall having an end that defines an aperture to the chamber and the wall of the base has a first diameter, the base comprises an inner surface contiguous with the wall, the inner surface defining a cross sectional area of the base;

a component having a housing, the housing having an exterior surface, the exterior surface of the housing comprises a second diameter, a portion of the exterior surface being disposed within the chamber; and a metallic member having an inner surface and an outer surface, the inner surface being contiguous with the exterior surface of the component and the outer surface being contiguous with the surface of the wall so that the portion of the exterior surface of the component is retained within the chamber and the aperture of the chamber is hermetically sealed, the metallic member comprises an annulus, the inner surface of the metallic member comprises a first surface of the annulus normal to a central axis of the annulus and the outer surface of the metallic member comprises a second surface of the annulus, the second surface being concentric to the first surface, the inner surface of the annulus is substantially equal to the second diameter of the housing and the outer surface of the annulus is substantially equal to the first diameter of the base, wherein the annulus and exterior surface being disposed within the base, and wherein the base comprises an injector cup.

30. An assembly comprising:

a base having a wall disposed about a longitudinal axis, the wall having a surface exposed to the longitudinal axis, the surface defining a chamber, the wall having an end that defines an aperture to the chamber, the base comprising a fuel rail;

a component having a housing, the housing having an exterior surface spaced from the surface of the base, a portion of the exterior surface being disposed within the chamber; and a metallic member having an inner surface and an outer surface, the inner surface having a lower surface roughness than the surface roughness of the outer surface, the inner surface being contiguous with the exterior surface of the component and the outer surface being contiguous with the surface of the wall so that the portion of the exterior surface of the component is retained within the chamber and the aperture of the chamber is hermetically sealed, the metallic member having a tubular wall having a cross-sectional area approximately equal to a cross sectional area of the component, the tubular wall including:

an inner surface and an outer surface;

a sleeve portion proximate the base, the inner surface and outer surface of the sleeve portion being substantially parallel to the longitudinal axis; and a lead-in portion extending away from the sleeve portion and being contiguous therewith, the inner and outer surfaces of the lead-in portion curling away from the longitudinal axis as they extend away from the sleeve portion.

31. The assembly of claim 30, wherein the component comprises an end cap.

32. An assembly comprising:

a base having a wall disposed about a longitudinal axis, the wall having a surface exposed to the longitudinal axis, the surface defining a chamber, the wall having an end that defines an aperture to the chamber;

a component having a housing, the housing having an exterior surface spaced from the surface of the base, a portion of the exterior surface being disposed within the chamber, the component comprising a damper; and a metallic member having an inner surface and an outer surface, the inner surface having a lower surface roughness than the surface roughness of the outer surface, the inner surface being contiguous with the exterior surface of the component and the outer surface being contiguous with the surface of the wall so that the portion of the exterior surface of the component is retained within the chamber and the aperture of the chamber is hermetically sealed, the metallic member having a tubular wall having a cross-sectional area approximately equal to a cross sectional area of the component, the tubular wall including:

an inner surface and an outer surface;

a sleeve portion proximate the base, the inner surface and outer surface of the sleeve portion being substantially parallel to the longitudinal axis; and a lead-in portion extending away from the sleeve portion and being contiguous therewith, the inner and outer surfaces of the lead-in portion curling away from the longitudinal axis as they extend away from the sleeve portion.

* * * * *